2,709,657
STABILIZATION OF DEHYDRATED VEGETABLES

Tod W. Campbell, Orinda, and Galvin M. Coppinger, El Cerrito, Calif., assignors to the United States of America as represented by the Secretary of Agriculture No Drawing. Application August 1, 1951,
Serial No. 239,829

11 Claims. (Cl. 99—171)

(Granted under Title 35, U. S. Code (1952), sec. 266)

The invention herein described may be manufactured and used by or for the Government of the United States of America for governmental purposes throughout the world without the payment to us of any royalty thereon.

This invention relates to the preservation of dehydrated vegetables containing natural fats, especially dehydrated potatoes, by stabilizing the natural fat content of the vegetable material.

It is well known that vegetables can be subjected to dehydration in order to lower their moisture contents to such levels that they are no longer subject to microbial attack and are thus essentially self-preserving. However, upon storage dehydrated vegetables are subject to deterioration by reason of two separate mechanisms: (1) browning and (2) rancidification. Both of these deteriorative processes involve the development of disagreeable odors and flavors. It has been shown that the moisture content of the dehydrated product has a great influence on these changes. Thus with dehydrated potatoes at a moisture content of about 5–10%, both browning and rancidification take place at about the same rate when stored at room temperature (about 70° F.). At moisture levels above 10%, browning predominates and rancidification occurs at a very slow rate. At moisture levels below 5%, which are desirable from an economic standpoint, rancidification is the major deteriorative process whereas browning is greatly retarded. It is evident from the above that if rancidification could be controlled, products of low moisture content would be most suitable as they contain pound for pound the most foodstuff and are relatively free from browning on storage. However, the problem of rancidification has been difficult to solve because of the nature and distribution of the fat in the vegetable tissue. Thus these tissues are largely made up of cellulose and starch with only a small proportion of fat (about 0.3% in the case of potatoes), this fat being in the form of minute droplets distributed throughout the tissue. It is this fat, of course, which is responsible for the rancidification. Attempts have been made in the past to prevent rancidification of dehydrated vegetables by spraying them with an antioxidant dissolved in an organic solvent. Such treatment had little or no useful result primarily for the reason that the antioxidant was largely concentrated on the surface of the tissue whereby it was out of contact with the major portion of the fat which as stated above is distributed throughout the tissue.

We have found that rancidification of dehydrated vegetables can be controlled when an antioxidant is applied in a particular manner, that is, when it is dispersed throughout the structure of the vegetable tissue so that it is in intimate contact with the natural fat particles distributed in the vegetable tissue. In this connection it is to be noted that the rancidification of fats is an autocatalytic process which involves peroxide formation which in turn leads to free radicals. These free radicals initiate and catalyze chain reactions which cause the formation of off odors and flavors. All of these reactions occur in the fat phase. The role of the antioxidant is to destroy the free radicals and consequently prevent the chain reactions which lead to rancidification. In our process, rancidification is prevented because each particle of fat is in contact with antioxidant whereby this agent is in a position to destroy free radicals and thus prevent the chain reaction.

In order to disperse the antioxidant through the vegetable tissue we may use several different techniques, as follows:

The first technique is applicable at any stage prior to dehydration, the important point being that the vegetable material be treated while it is moist. In this technique, the antioxidant is dissolved in water and sprayed on the vegetable. If desired, the vegetable may be dipped into an aqueous solution of the antioxidant although, in general, spraying is preferred as it gives better control of antioxidant concentration. In the normal processing of dehydrated products, it is customary to blanch the vegetables and then subject them to sprays of water for cooling. In addition, the blanched product may be sprayed with an aqueous solution of a sulphiting agent (sulphur dioxide, sodium sulphite, sodium bisulphite, etc.) in order to minimize browning. Either the washing or sulphiting sprays can be utilized for the introduction of the antioxidant by simply dissolving the antioxidant in the liquid used for the spray. Since the antioxidants are poorly soluble in water it is necessary to employ vigorous agitation and use an essentially saturated solution of the antioxidant. Actually, the concentration of antioxidant in the spray liquid is not critical, since the ultimate aim is to apply sufficient spray so that the vegetable contains from about 0.001 to about 0.1% of the antioxidant (on a dry basis).

In this type of procedure, thorough penetration and dispersion of the antioxidant occurs because the interstices of the tissue are filled with water, these interstices thus providing the channels through which the antioxidant solution can enter the tissue and penetrate into every portion thereof. It is further to be emphasized that at this stage of the processing the vegetable is moist and spraying with the antioxidant solution does not interfere with the orderly progress of the operations. Although we prefer to dissolve the antioxidant in the cooling water or sulphiting solution, it is evident that if desired, the vegetables may be subjected to a spray of water containing the antioxidant just for this purpose and not concerned with cooling, sulphiting, or other operation.

A second method of dispersing the antioxidant throughout the tissue of the vegetable involves initial production of the dehydrated product by the conventional method. This dehydrated product is placed in a container which also contains a pad of paper, cloth, clay bentonite, etc. impregnated with the antioxidant. The container is then sealed. Upon standing, the antioxidant vaporizes and diffuses into the vegetable tissue. In this case, the penetration of the tissue involves a vapor phase system. Since the product has been dehydrated, the interstices in the tissue are filled with air and these interstices provide the channels by which the antioxidant vapors can penetrate and be distributed throughout the tissue structure. In general, the pad should contain an amount of antioxidant equal to about 0.001 to about 0.1% of the weight of the dehydrated product in the container. Naturally, the higher proportions within this range will effect a greater protection against rancidity. A greater proportion of antioxidant than the stated range can be used but may impart a detectable flavor to the food product. The pad containing the antioxidant need not be in actual contact with the foodstuff since diffusion takes place in the vapor phase. Thus it may be convenient to fasten the pad on the lid of the container or enclose it in a foraminous receptacle attached to the lid. In such case when the container is opened for use there will be no danger that the pad will be consumed with the edible material.

A variant of this second technique involves mixing together the dehydrated vegetable with a dry mixture of an antioxidant and an edible dry powdered composition, this latter acting merely as a diluent. The diluent may be, for example, sugar, starch, or a powdered dehydrated vegetable. For example, dehydrated diced potatoes may be agitated with a mixture of the antioxidant and powdered dehydrated potatoes. The product in any case is placed in a closed container whereupon vaporization and penetration of the antioxidant takes place as explained above. As in the case of the antioxidant pad, the amount of antioxidant applied in general should be from about 0.001 to about 0.1% of the weight of the dehydrated vegetable product.

In carrying out our process, we can use any antioxidant which exhibits a stabilizing effect on fats. Some of the agents which may be used are listed below merely by way of example:

Tocopherols, i. e., alpha-, beta-, and gamma-tocopherol.
Gum guaiac.
Nordihydroguaiaretic acid.
Gallic acid and its esters as for example, the propyl, butyl, amyl, hexyl, octyl, dodecyl, tetradecyl, hexadecyl, and octadecyl esters.
Ascorbic acid and isoascorbic acid and their esters, as for example, ascorbyl or isoascorbyl palmitate, stearate, and so forth.
Thiodipropionic acid and its esters, as for example, the dioctyl and the didodecyl esters.
Phenolic derivatives, as for example, butylated hydroxyanisole; catechol monobenzoate; 2-tert-butyl, 4-methoxy phenol; p-tert-butyl catechol; 2,4-dimethyl-6-tert-butyl phenol, dibenzyl catechol; octyl cresol; 2,7-dihydroxy naphthalene; 2,5-dihydroxy diphenyl; and so forth.
Hydroquinone derivatives, as for example, 2,5-ditert-butyl hydroquinone; 2,5-dibenzyl hydroquinone; 2,5-di-tert-amyl hydroquinone; 2,5-bis(dimethylaminomethyl) hydroquinone; 2,5-bis(dimethylaminomethyl) quinone; 2,5-bis(dimethylaminomethyl)-3,6-di-tert butyl hydroquinone; 2,5 - bis(dimethylaminomethyl) - 3,6-di-tert butyl quinone; 2,5-bis(dimethylaminomethyl)-3,6-di-tert amyl hydroquinone; 2,5-bis(dimethylaminomethyl)-3,6-di-tert amyl quinone; and so forth.
Quinoline derivatives, as for example, 6-ethoxy-2,2,4-trimethyl-1,2-dihydroquinoline; 6-phenyl-2,2,4-trimethyl-1,2 - dihydroquinoline; 2,2,4 - trimethyl - 1,2 - dihydroquinoline; etc.
Hydrocaffeic acid and its esters, for example, ethyl hydrocaffeate.
Pyrogallol derivatives, as for example, 4-acetyl pyrogallol; 4-propionyl pyrogallol; 4-butyryl pyrogallol; 4-valeryl pyrogallol; 4-isovaleryl pyrogallol; 4-(diethylacetyl) pyrogallol; 4-acetyl-6-ethyl pyrogallol; 4-acetyl-6-tert. butyl pyrogallol; and so forth.
Benzoic acid derivatives, as for example, 2-amino-3-hydroxybenzoic acid and its esters, for example, the methyl, ethyl, propyl, and butyl esters.

In our technique of applying the antioxidant by a water spray to the moist vegetable, volatility is not a factor and any of the above-listed materials can be used. Where the antioxidant is to be applied by vapor phase diffusion from a pad or a dust on the surface of the dehydrated product then a volatile agent is required. In this category would be classed those antioxidants from the above list as follows: gum guaiac, nordihydroguaiaretic acid, esters of gallic acid, esters of thiodipropionic acid, phenolic derivatives, hydroquinone derivatives, quinoline derivatives, esters of hydrocaffeic acid, pyrogallol derivatives, and esters of 2-amino-3-hydroxybenzoic acid. In describing antioxidants as volatile we do not mean volatile in the sense say of gasoline or ether but volatile to the extent that the material has an appreciable vapor pressure at atmospheric conditions of temperature and pressure and consequently has a distinct odor. Volatility to the extent that say 10 mg. of the product will vaporize at atmospheric pressure and temperature in several weeks is adequate for the purposes of this invention.

In short, we can use any antioxidant which is of use in stabilizing edible fats. In many cases an increase in antioxidant power is obtained by employing mixtures of different antioxidants or mixtures of a single antioxidant with a substance which in itself possesses little or no antioxidant power (antioxidant-synergists). In the latter category may be mentioned such agents as citric acid, phosphoric acid, and phospho-lipids such as cephalin and lecithin, ethylene diamine tetra-acetic acid and its salts, such as the tetra sodium salt. In utilizing mixtures, the mixture may be applied as such to the vegetable product either by water spray in the moist state or by use of a pad after dehydration. However, the separate agents can be applied separately. Thus for example the vegetable while in moist state may be sprayed with an aqueous solution of citric acid and after dehydration tertiary butylated hydroxyanisole or other volatile antioxidant may be applied either by dusting or on a pad within a container of the dehydrated product. This technique is admirably suited to situations where the antioxidant proper is volatile and where the agent which increases the antioxidant effect is not volatile. Our process thus encompasses not only the use of individual antioxidants but also mixtures of individual antioxidants and mixtures of antioxidants with agents which increase the antioxidant effect. In any case the components of the mixture may be applied together or individually in sequence.

Our process is of wide versatility and can be applied to the stabilization of all types of vegetables which contain fat and which are subject to rancidification on storage of the dehydrated product. Thus the process can be applied to the leafy vegetables such as spinach, cabbage, kale, Swiss chard, etc.; the legumes such as beans and peas; the root crops such as turnips, rutabagas, beets, carrots, potatoes, sweet potatoes, onions, etc.; cereals such as rice, wheat, etc.

The following experiments demonstrate our invention in greater detail. It is understood that these examples are furnished only by way of illustration and not limitation.

In most cases the products and controls were stored under an atmosphere of oxygen and at a temperature of 100° F.; these factors representing accelerated storage conditions. It is evident that in practice the products would be packed in air or preferably in nitrogen and would be stored at room temperature.

*Example I*

A batch of raw potato dice was blanched then divided into two lots.

A. One lot of the blanched potatoes was sprayed with an aqueous solution containing 0.2% sodium sulphite and sodium bisulphite, 0.05% tertiarybutylated hydroxyanisole, and 0.02% citric acid. The treated dice were then dehydrated to a moisture content of 4%.

B. The second lot of blanched potatoes (control) was sprayed with an aqueous solution containing only 0.2% sodium sulphite and sodium bisulphite. The treated dice were then dehydrated to a moisture content of 4%.

The products in accordance with this invention and the control products were placed in cans under an atmosphere of oxygen, the cans were sealed and stored at 100° F. It was observed that the products in accordance with this invention exhibited no rancidity after storage for more than 3 months whereas the control sample was rancid in 3 weeks.

*Example II*

A. One-tenth gram of tertiarybutylated hydroxyanisole was diluted by thorough mixing with 9.9 grams of dehydrated potato granules. One gram of this composition was then thoroughly mixed and shaken with 100 grams of freshly-prepared dehydrated potato granules. The product was placed in cans under an atmosphere of oxygen, the cans were sealed, and stored at 100° F.

The procedure of part A was repeated replacing the tertiarybutylated hydroxyanisole with the same quantity of: (B) thiodipropionic acid, (C) propyl gallate, and (D) a mixture of tertiarybutylated hydroxyanisole, propyl gallate, and citric acid. The same storage conditions as in part A were employed.

*Control.*—A sample of the freshly-prepared dehydrated potatoes was placed in cans under an atmosphere of oxygen, the cans were sealed and stored at 100° F.

It was observed that products A, B, C, and D were still perfect and exhibited no rancidity after 3 months' storage whereas the control sample was rancid after 3 weeks' storage.

*Example III*

Raw potato dice were blanched, sprayed with an aqueous solution containing sodium sulphite and bisulphite plus 0.02% citric acid, then dehydrated. The dehydrated products were placed in a series of #2 cans (100 grams per can) under an atmosphere of oxygen. In the case of half the cans, a blotting paper pad containing 20 mg. of tertiarybutylated hydroxyanisole was placed in each can. No antioxidant was added to the other half of the cans which served as controls. All the cans were then sealed and stored at 100° F. Individual cans were opened at intervals for appraisal of the contents. It was observed that the products canned with the pads of antioxidant were free from rancidity after storage for 4 months whereas the controls (no antioxidant) were rancid in 3½ weeks.

It was also noted that after 2 weeks of storage, one-half of the antioxidant had diffused from the pad into the potato dice.

*Example IV*

Dehydrated potato dice were mixed with a dust made up of 100 grams of powdered dehydrated potato and 1 gram of a mixture of tertiarybutylated hydroxyanisole, propyl gallate, and citric acid. The non-adhering dust was removed and the treated dice placed in cans. It was observed that the dice treated in this manner were considerably more stable on storage toward development of rancidity than were untreated dice.

Having thus described our invention, we claim:

1. A process of stabilizing a dehydrated vegetable containing natural fats which comprises dispersing a fat-stabilizing antioxidant throughout the structure of the vegetable tissue whereby the antioxidant is in intimate contact with the natural fat particles distributed in the tissue.

2. The process of claim 1 wherein the antioxidant is 6-ethoxy-2,2,4-trimethyl-1,2-dihydroquinoline.

3. The process of claim 1 wherein the antioxidant is tertiarybutylated hydroxyanisole.

4. The process of claim 1 wherein the antioxidant is thiodipropionic acid.

5. The process of claim 1 wherein the antioxidant is propyl gallate.

6. The process of claim 1 wherein the antioxidant is a mixture of tertiary-butylated hydroxyanisole, propyl gallate and citric acid.

7. A process of preparing stabilized dehydrated vegetables containing natural fats which comprises impregnating the vegetables while moist with an aqueous solution of a fat-stabilizing antioxidant thereby to cause dispersion of the antioxidant throughout the vegetable tissue so that the antioxidant is in intimate contact with the natural fat particles distributed in the tissue, then dehydrating the vegetables which have been so treated.

8. A process of preparing stabilized dehydrated vegetables containing natural fats which comprises enclosing dehydrated vegetables in a sealed container together with a pad containing a volatile fat-stabilizing antioxidant, whereby on standing the antioxidant vaporizes and disperses throughout the vegetable tissue so that it is in intimate contact with the natural fat particles distributed in the tissue.

9. A process of preparing stabilized dehydrated vegetables containing natural fats which comprises admixing a dehydrated vegetable with an edible dry composition containing a volatile fat-stabilizing antioxidant and placing the resulting admixture in a sealed container, whereby on standing the antioxidant vaporizes and disperses throughout the vegetable tissue so that it is in intimate contact with the natural fat particles distributed in the issue.

10. A process for preparing stabilized dehydrated vegetables containing natural fats which comprises impregnating the vegetable while moist with an aqueous solution of an antioxidant synergist, dehydrating the impregnated vegetable, then placing the dehydrated product in a sealed container where it is in contact with the vapors of a fat-stabilizing antioxidant, whereby the vapors disperse throughout the vegetable tissue so that it is in intimate contact with the natural fat particles distributed in the tissue.

11. The process of claim 10 wherein the synergist is citric acid and the antioxidant is tertiarybutylated hydroxyanisole.

References Cited in the file of this patent

UNITED STATES PATENTS

| | | |
|---|---|---|
| 1,842,720 | Harris | Jan. 26, 1932 |
| 2,093,865 | Denny | Sept. 21, 1937 |
| 2,176,347 | Jansen | Oct. 17, 1939 |
| 2,315,858 | Redmond et al. | Apr. 6, 1943 |
| 2,336,291 | Phillips | Dec. 7, 1943 |
| 2,510,543 | Borsook | June 6, 1950 |
| 2,511,804 | Hall et al. | June 13, 1950 |
| 2,536,176 | Harriss | Jan. 2, 1951 |
| 2,565,942 | Borsky | Aug. 28, 1951 |
| 2,572,762 | Rivoche | Oct. 23, 1951 |
| 2,607,694 | Rinck | Aug. 19, 1952 |

OTHER REFERENCES

"The Journal of the American Oil Chemists Society," December 1949, pages 687 to 690, inclusive, article entitled "The Use of Antioxidants in Potato Chipping."